Figure 1:
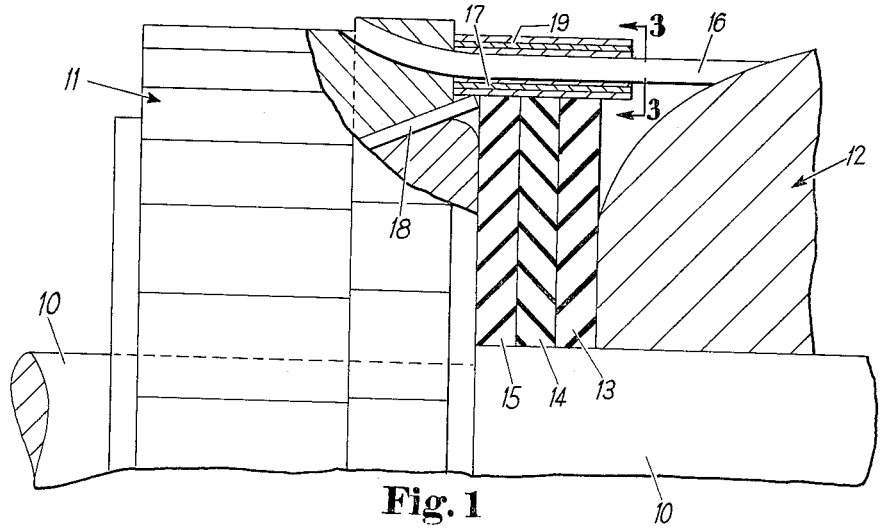

Sept. 28, 1965 J. J. BOLZAN, JR 3,209,186
CUSHIONED COMMUTATOR LEADS
Filed April 23, 1963

INVENTOR.
JAMES J. BOLZAN JR,
BY
ATTORNEYS.

United States Patent Office 3,209,186
Patented Sept. 28, 1965

3,209,186
CUSHIONED COMMUTATOR LEADS
James J. Bolzan, Jr., Springfield, Ohio, assignor to Robbins & Myers, Inc., Springfield, Ohio, a corporation of Ohio
Filed Apr. 23, 1963, Ser. No. 275,063
7 Claims. (Cl. 310—234)

This invention relates to electric motor armatures, and more specifically to a resilient connection of the armature leads to the commutator structure.

According to conventional practice, the lead wires from the armature windings are connected to the commutator structure, and the entire armature is then covered with a protective material which serves to seal out moisture or other foreign materials and prevent damage or short circuiting of the armature windings. The covering material may be either a bonding varnish, or in some cases a coating of one of the modern plastic materials. In any event, this solidified coating material also has the effect of holding the armature leads very rigidly in the area immediately behind the commutator structure. This rigidity, especially in the presence of conditions of excessive vibration, leads to a rapid fatigue of the lead wires, and their subsequent breakage.

Accordingly, it is a primary object of this invention to provide an armature in which the leads from the armature windings are resiliently connected to the commutator structure, thereby greatly increasing the lead life of the armature.

Another object of this invention is to provide a method of cushioning the armature leads to prevent breakage due to mechanical or thermal fatigue.

It is a further object of this invention to provide such a resilient lead connection which may be utilized with a wide variety of armature constructions. That is, this invention is equally applicable to both random or form wound armatures, and can be used with a wide variety of commutator structures.

Figure 2:
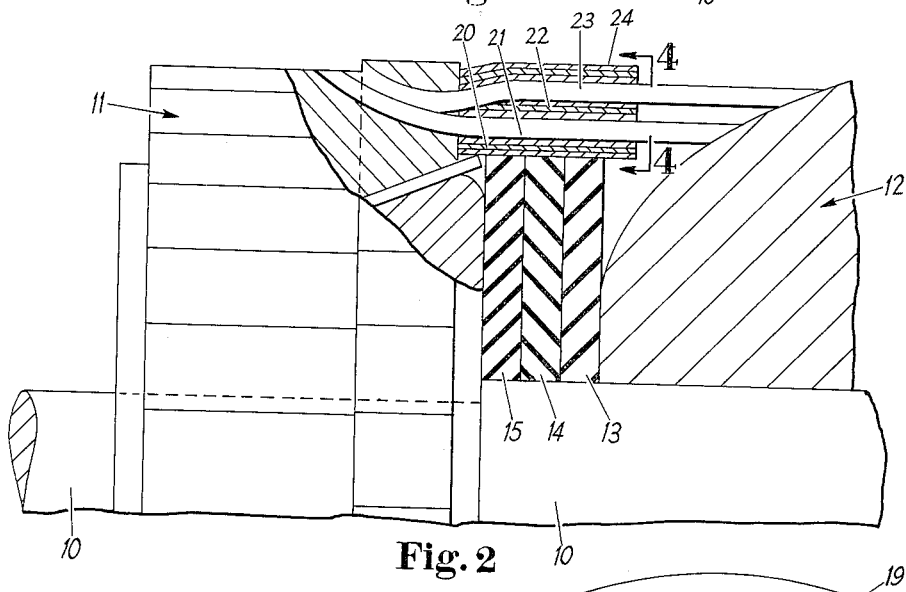
Figures 3, 4:
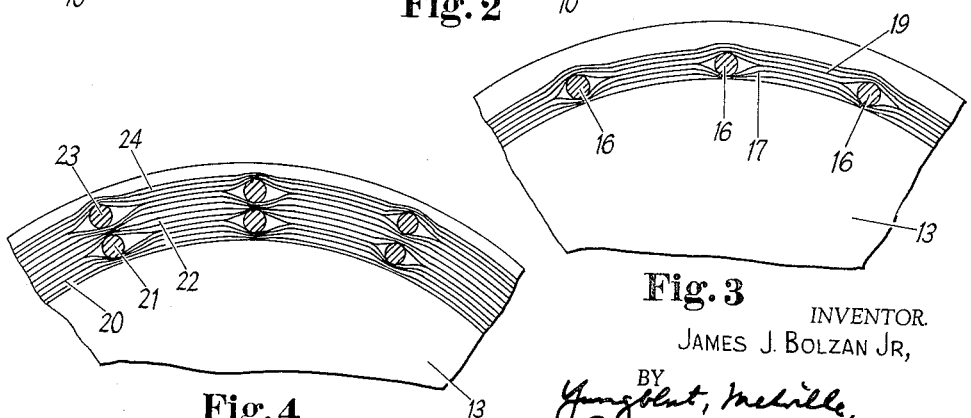

Other objects and advantages of this invention will become apparent as the specification, taken in conjunction with the accompanying drawings, proceeds. The several views of the drawing may be described as follows:

FIGURE 1 is a partial side elevational view with certain parts shown in cross section;
FIGURE 2 is a view similar to FIGURE 1, showing a modification of this invention.
FIGURE 3 is a cross sectional view taken along the line 3—3 of FIGURE 1; and
FIGURE 4 is a cross sectional view taken along the line 4—4 of FIGURE 2.

Referring now specifically to FIGURE 1, the armature of this invention includes a shaft 10, upon which is mounted a commutator structure indicated generally at 11. Also mounted on the shaft 10 and spaced from the commutator structure 11 is a core having the coil windings indicated at 12. It will be understood that the specific details of the armature winding and of the commutator structure do not per se form a part of this invention, and hence these elements will not be described in further detail.

Between the armature windings 12 and the commutator structure 11 are a plurality of insulating washers or spacers 13, 14 and 15. The number and size of the insulating washers will of course, depend on both the dielectric and processing requirements of the particular armature being constructed, and on the material of which they are made.

At 16 in FIGURE 1 is illustrated a lead from the armature windings 12 which will be connected to one of the commutator bars in any suitable manner. It will be understood that there will be a plurality of such leads from the armature windings, and that these leads will be circumferentially spaced about the armature shaft 10, and connected respectively to the several commutator bars.

The resilient connection of this invention may be accomplished in the following manner. Prior to connecting the leads to the commutator structure, a resilient band 17 is formed over the insulating washers 13, 14 and 15, and extending from the V-ring 18 of the commutator structure to an area near the end coils of the windings. This band 17 may be formed from a plurality of layers of a suitable resilient tape.

The lead 16 is then inserted and anchored in the commutator slot, across the resilient band 17. A second resilient band 19 is then placed over the band 17, covering the leads 16.

In the preferred practice of this invention, the bands 17 and 19 will be formed from a number of wraps of a silicone rubber tape which is self-vulcanizing at room temperature. An again, the size and thickness of the bands 17 and 19 will be determined by the requirements of the particular armature being processed. The self-vulcanizing tape just described will cause the bands to very tightly adhere to each other, thereby forming a sealed, resilient band which completely encloses the armature leads. It will be noted that the sealed enclosure extends from the insulating washers to the top of the commutator structure, and from the back of the commutator bars to an area near the end coils of the winding.

A slight modification of the invention has been shown in FIGURE 2. This modification may be used where there are a large number of leads from the armature windings, or where greater insulation is desired between the various leads. According to this modification, the leads are divided into one or more groups or layers. A first resilient band 20 is formed over the insulating washers in the manner described above. A first group of leads 21 is then connected to the commutator structure across the band 20. Thereupon a second band 22 is formed overlying the first band 20, and again covering the leads 21. The second group or layer of leads 23 are then connected to the commutator structure, and still another resilient band 24 is formed thereover.

Armatures made according to the teachings of this specification may still be dipped in an insulating varnish, or covered with some other protective material. Very small amounts of the protective material may flow into the interstices between the lead wires and the resilient bands, but the presence of the resilient band will prevent the formation of a rigid lead structure which contributes to high stress and breakage.

While the invention has been described in terms of an exemplary embodiment and an obvious modification thereof, this is not to be construed as a limitation. Many modifications may be made in this invention without departing from its scope and spirit, and no limitations are intended except insofar as set forth in the appended claims.

What is claimed as new, and what it is desired to secure by Letters Patent is:

1. In an electric motor armature having a shaft, a commutator structure mounted on said shaft, and a plurality of coil windings associated therewith, each winding having a lead connected to said commutator structure, the improvement which comprises; a first resilient band surrounding said shaft between said commutator structure and said windings, said leads crossing said band at circumferentially spaced intervals, and a second resilient band overlying said first band and covering said leads, said first and second bands being tightly adhered to each other.

2. The improvement claimed in claim 1 wherein said first and second resilient bands are formed of silicone rubber which is self-vulcanizing at room temperature.

3. In an electric motor armature having a shaft, a commutator structure mounted on said shaft, and a plurality of coil windings associated therewith, each winding having a lead connected to said commutator structure, the improvement which comprises: the first layer of resilient tape surrounding said shaft and extending from said commutator structure to said windings, said leads crossing said layer at circumferentially spaced intervals, and a second layer of resilient tape overlying said first layer and covering said leads, said first and second layers being tightly adhered to each other.

4. The improvement claimed in claim 3 wherein said first and second layers each comprise a plurality of wraps of silicone tape, said silicone tape being self-vulcanizing at room temperature, whereby a sealed, resilient band enclosing said leads is created.

5. The improvement claimed in claim 4 wherein said electric motor includes additional leads from said windings to said commutator structure, said additional leads crossing said second layer of resilient tape, and including at least one subsequent layer of resilient tape overlying said second layer and covering said additional leads.

6. An armature including a shaft; a commutator structure on said shaft; a core having a plurality of coil windings secured to said shaft and spaced from said commutator structure; insulating means surrounding said shaft between said windings and said commutator structures; a first layer of resilient tape surrounding said insulating means and extending from said commutator structure to said windings; leads from said windings crossing said first layer at circumferentially spaced intervals and connected to said commutator structure; and a second layer of resilient tape overlying said first layer and covering said leads; said first and second layers being tightly adhered to each other whereby a sealed, resilient band completely enclosing said leads from said commutator structure to said windings is created.

7. The armature claimed in claim 6 including additional leads from said windings to said commutator structure, said additional leads crossing said second layer of resilient tape, and including at least one subsequent layer of resilient tape overlying said second layer and covering said additional leads.

References Cited by the Examiner

UNITED STATES PATENTS 2,535,825   12/50   Wahlberg.
2,897,385   7/59   Powell _____ 310—234

MILTON O. HIRSHFIELD, *Primary Examiner.*